United States Patent
Kollin et al.

(10) Patent No.: US 10,210,844 B2
(45) Date of Patent: Feb. 19, 2019

(54) HOLOGRAPHIC NEAR-EYE DISPLAY

(71) Applicant: Microsoft Technology Licensing, LLC, Redmond, WA (US)

(72) Inventors: Joel S. Kollin, Seattle, WA (US); Andreas Georgiou, Cambridge (GB); Adrian Travis, Seattle, WA (US); Douglas Christopher Burger, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 6 days.

(21) Appl. No.: 14/754,451

(22) Filed: Jun. 29, 2015

(65) Prior Publication Data
US 2016/0379606 A1    Dec. 29, 2016

(51) Int. Cl.
*G02B 27/48*     (2006.01)
*G09G 5/391*     (2006.01)
(Continued)

(52) U.S. Cl.
CPC ......... *G09G 5/391* (2013.01); *G02B 27/0093* (2013.01); *G02B 27/0172* (2013.01); *G03H 1/0005* (2013.01); *G03H 1/2294* (2013.01); *G06T 3/4038* (2013.01); *G02B 2027/0123* (2013.01); *G02B 2027/0174* (2013.01); *G02B 2027/0178* (2013.01); *G03H 2225/32* (2013.01); *G03H 2225/52* (2013.01); *G03H 2225/60* (2013.01); *G03H 2226/05* (2013.01);
(Continued)

(58) Field of Classification Search
None
See application file for complete search history.

(56) References Cited

U.S. PATENT DOCUMENTS 4,012,119 A    3/1977    Adams et al.
4,826,300 A    5/1989    Efron et al.
(Continued)

FOREIGN PATENT DOCUMENTS

DE    102012100201 A1    9/2012
EP        2447787 A1    5/2012
(Continued)

OTHER PUBLICATIONS

Zschau, et al., "Generation, Encoding and Presentation of Content on Holographic Displays in Real Time", In Proceedings of Three-Dimensional Imaging, Visualization, and Display, vol. 7690, May 14, 2010, 14 pages.
(Continued)

*Primary Examiner* — Martin Mushambo
(74) *Attorney, Agent, or Firm* — Alleman Hall Creasman & Tuttle LLP (57) ABSTRACT

Embodiments are disclosed for display devices including holographic optical elements for directing light toward image producing panels. An example display device includes a phase modulating image producing panel, and a holographic optical element configured to receive collimated light and to output converging light toward the phase modulating image producing panel, the phase modulating image producing panel being configured to use at least a portion of the converging light to produce an image with collimated or diverging light.

22 Claims, 8 Drawing Sheets

(51) Int. Cl.
  *G02B 27/00* (2006.01)
  *G02B 27/01* (2006.01)
  *G03H 1/00* (2006.01)
  *G06T 3/40* (2006.01)
  *G03H 1/22* (2006.01)

(52) U.S. Cl.
  CPC ..... *G03H 2227/02* (2013.01); *G03H 2270/55* (2013.01); *G09G 2340/0407* (2013.01); *G09G 2354/00* (2013.01)

(56) References Cited

U.S. PATENT DOCUMENTS

| | | |
|---|---|---|
| 5,198,653 A | 3/1993 | Shen et al. |
| 5,331,446 A | 7/1994 | Hirai et al. |
| 5,715,337 A | 2/1998 | Spitzer et al. |
| 5,815,222 A | 9/1998 | Matsuda et al. |
| 5,907,416 A | 5/1999 | Hegg et al. |
| 6,043,910 A | 3/2000 | Slinger |
| 6,075,512 A | 7/2000 | Patel et al. |
| 6,404,538 B1 | 6/2002 | Chen et al. |
| 6,480,307 B1 | 11/2002 | Yang |
| 6,512,560 B2 | 1/2003 | Ohtake et al. |
| 6,512,566 B1 | 1/2003 | Yamagishi et al. |
| 6,690,447 B1 | 2/2004 | Stephenson et al. |
| 6,760,135 B1 | 7/2004 | Payne et al. |
| 7,068,910 B2 | 6/2006 | Duine et al. |
| 7,253,799 B2 | 8/2007 | Lee et al. |
| 7,845,841 B2 | 12/2010 | Sampsell |
| 7,876,405 B2 | 1/2011 | Ito et al. |
| 7,976,208 B2 | 7/2011 | Travis |
| 8,218,211 B2 | 7/2012 | Kroll et al. |
| 8,233,204 B1 | 7/2012 | Robbins et al. |
| 8,477,425 B2 | 7/2013 | Border et al. |
| 8,487,980 B2 | 7/2013 | Kroll et al. |
| 8,547,615 B2 | 10/2013 | Leister |
| 8,553,302 B2 | 10/2013 | Leister |
| 8,625,183 B2 | 1/2014 | Khan |
| 8,698,705 B2 | 4/2014 | Burke |
| 8,810,913 B2 | 8/2014 | Simmonds et al. |
| 9,122,244 B2 | 9/2015 | Lee et al. |
| 9,179,841 B2 | 11/2015 | Kim |
| 9,232,172 B2 | 1/2016 | Perkins et al. |
| 9,256,007 B2 | 2/2016 | Vasylyev |
| 9,335,604 B2 | 5/2016 | Popovich et al. |
| 9,341,846 B2 | 5/2016 | Popovich et al. |
| 9,406,166 B2 | 8/2016 | Futterer |
| 2003/0067760 A1 | 4/2003 | Jagt et al. |
| 2004/0108971 A1 | 6/2004 | Waldern et al. |
| 2004/0227703 A1 | 11/2004 | Lamvik et al. |
| 2005/0243258 A1 | 11/2005 | Oh |
| 2006/0028400 A1 | 2/2006 | Lapstun et al. |
| 2007/0019264 A1 | 1/2007 | Tanijiri et al. |
| 2008/0049450 A1 | 2/2008 | Sampsell |
| 2009/0244415 A1 | 10/2009 | Ide |
| 2010/0027289 A1 | 2/2010 | Aiki et al. |
| 2010/0053771 A1 | 3/2010 | Travis et al. |
| 2010/0056274 A1* | 3/2010 | Uusitalo ............ G02B 27/017 463/31 |
| 2010/0073744 A1 | 3/2010 | Zschau et al. |
| 2010/0103485 A1 | 4/2010 | Haussler |
| 2010/0149073 A1 | 6/2010 | Chaum et al. |
| 2010/0157399 A1 | 6/2010 | Kroll et al. |
| 2010/0186818 A1 | 7/2010 | Okorogu et al. |
| 2012/0013988 A1 | 1/2012 | Hutchin |
| 2012/0062850 A1 | 3/2012 | Travis |
| 2012/0088478 A1 | 4/2012 | Kim et al. |
| 2012/0105310 A1 | 5/2012 | Sverdrup et al. |
| 2012/0105765 A1 | 5/2012 | Kawai et al. |
| 2012/0120467 A1 | 5/2012 | Gruhlke et al. |
| 2012/0188791 A1 | 7/2012 | Voloschenko et al. |
| 2013/0022222 A1 | 1/2013 | Zschau et al. |
| 2013/0050186 A1 | 2/2013 | Large et al. |
| 2013/0051730 A1 | 2/2013 | Travers et al. |
| 2013/0181888 A1 | 7/2013 | Kuriya et al. |
| 2013/0201094 A1 | 8/2013 | Travis et al. |
| 2013/0202297 A1* | 8/2013 | Martinelli ............ G02B 6/3512 398/49 |
| 2013/0222384 A1 | 8/2013 | Futterer |
| 2013/0329301 A1 | 12/2013 | Travis et al. |
| 2014/0033052 A1 | 1/2014 | Kaufman et al. |
| 2014/0063054 A1 | 3/2014 | Osterhout et al. |
| 2014/0085734 A1 | 3/2014 | Tanaka et al. |
| 2014/0104618 A1 | 4/2014 | Potsaid et al. |
| 2014/0104664 A1 | 4/2014 | Lee et al. |
| 2014/0104665 A1 | 4/2014 | Popovich et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0168735 A1 | 6/2014 | Yuan et al. |
| 2015/0016777 A1 | 1/2015 | Abovitz et al. |
| 2015/0036199 A1 | 2/2015 | Leister et al. |
| 2015/0085331 A1 | 3/2015 | Chae |
| 2015/0235448 A1 | 8/2015 | Schowengerdt |
| 2015/0277123 A1 | 10/2015 | Chaum et al. |
| 2015/0277375 A1 | 10/2015 | Large et al. |
| 2015/0378080 A1 | 12/2015 | Georgiou et al. |
| 2016/0041393 A1 | 2/2016 | Inagaki |
| 2016/0077338 A1 | 3/2016 | Robbins et al. |
| 2016/0077339 A1 | 3/2016 | Christmas et al. |
| 2016/0139402 A1 | 5/2016 | Lapstun |
| 2016/0170372 A1 | 6/2016 | Smithwick |
| 2016/0195720 A1 | 7/2016 | Travis et al. |
| 2016/0379606 A1 | 12/2016 | Kollin et al. |
| 2017/0078652 A1 | 3/2017 | Hua et al. |
| 2018/0003981 A1* | 1/2018 | Urey ...................... G02B 27/01 |

FOREIGN PATENT DOCUMENTS

| | | |
|---|---|---|
| GB | 2260203 A | 4/1993 |
| GB | 2461294 A | 12/2009 |
| GB | 2501754 A | 11/2013 |
| WO | 9735223 A1 | 9/1997 |
| WO | 9821612 A1 | 5/1998 |
| WO | 172037 A1 | 9/2001 |
| WO | 3013151 A2 | 2/2003 |
| WO | 2008046057 A2 | 4/2008 |
| WO | 2008049917 A1 | 5/2008 |
| WO | 2008155563 A1 | 12/2008 |
| WO | 2012088478 A1 | 6/2012 |
| WO | 2012103559 A1 | 8/2012 |
| WO | 2013028687 A2 | 2/2013 |
| WO | 2014085734 A1 | 6/2014 |
| WO | 2014151877 A1 | 9/2014 |
| WO | 2014167290 A1 | 10/2014 |
| WO | 2015032828 A1 | 3/2015 |
| WO | 2016105285 A1 | 6/2016 |

OTHER PUBLICATIONS

Reichelt, et al., "Holographic 3-D Displays—Electro-holography within the Grasp of Commercialization", In Proceedings of Advances in Lasers and Electro Optics, Apr. 1, 2010, 29 pages.

Yaras, et al., "State of the Art in Holographic Displays: A Survey", In Journal of Display Technology, vol. 6, Issue 10, Oct. 2010, pp. 443-454.

Mirza, et al., "Key Challenges to Affordable See Through Wearable Displays: The Missing Link for Mobile Ar Mass Deployment",Published on: Jun. 13, 2013 Available at: http://optinvent.com/HUD-HMD-benchmark.

U.S. Appl. No. 14/589,513, Travis, et al., "Virtual Image Display with Curved Light Path", filed Jan. 5, 2015.

Serati, S. et al., "Advances in liquid crystal based devices for wavefront control and beamsteering", In Proceedings of Advanced Wavefront Control: Methods, Devices, and Applications III, SPIE vol. 5894, Sep. 6, 2005, 14 pages.

"Spatial Light Modulators—XY Series", Boulder Nonlinear Systems website, Available at: http://bnonlinear.com/pdf/XYSeriesDS0909.pdf, Available as early as Jul. 20, 2014, Retrieved on: Feb. 23, 2016, 12 pages.

Zhang, Z. et al., "Fundamentals of phase-only liquid crystal on silicon (LCOS) devices", Nature.com online journal: Light: Science (56) References Cited

OTHER PUBLICATIONS

& Applications (2014) 3, Available at http://www.nature.com/lsa/journal/v3/n10/full/lsa201494a.html, Published online Oct. 24, 2014, 10 pages.
Willekens, O. et al., "Paper No. S1.3: Lead Zirconate Titanate-Based Transmissive Liquid Crystal Lens Approach", In Proceedings of Society for Information Display EuroDisplay 2015, Sep. 21, 2015, Het Pand, Ghent, Belgium, 1 page.
Travis, A., "Holographic Display", U.S. Appl. No. 14/921,864, filed Oct. 23, 2015, 38 pages.
ISA European Patent Office, International Search Report and Written Opinion issued in PCT Application No. PCT/US2016/039142, dated Dec. 9, 2016, WIPO, 17 pages.
ISA European Patent Office, International Search Report and Written Opinion Issued in PCT Application No. PCT/US2017/019231, dated May 26, 2017, WIPO, 14 Pages.
"100% Fill Factor White Paper", Boulder Nonlinear Systems, Inc., Available Online at http://www.auniontech.com/uploadfile/2014/01/100%20Fill%20Factor%20White%20Paper.pdf, Jan. 2008, 2 Pages.
"Composyt Light Labs", Retrieved from <<https://web.archive.org/web/20140102025940/http://composyt.com/>>, Retrieved on: Jan. 2, 2014, 1 Page.
"Lunar EVA Holographic Display (LEVAD)", Retrieved from <<https://web.archive.org/web/20151012021706/http://www.luminitrd.com/NASA.html>>, Retrieved on: Oct. 12, 2015, 4 Pages.
"SBG Labs Holographic Eye Adaptive Display (HEAD) Technology", Retrieved from <<https://www.youtube.com/watch?V=XkmqKeGn4yo>, Mar. 11, 2012, 1 Page.
"Stacked Flat Type Light Guide Panel", Retrieved from <<http://www.techbriefs.com/component/content/article/14337>>, May 1, 2011, 4 Pages.
"Final Office Action Issued in U.S. Appl. No. 14/227,834", dated Sep. 20, 2017, 9 Pages.
"Final Office Action Issued in U.S. Appl. No. 14/227,834", dated Nov. 3, 2016, 8 Pages.
"Non-Final Office Action Issued in U.S. Appl. No. 14/227,834", dated Feb. 27, 2017, 8 Pages.
"Non-Final Office Action Issued in U.S. Appl. No. 14/227,834", dated Nov. 9, 2015, 10 Pages.
"Final Office Action Issued in U.S. Appl. No. 14/589,513", dated Oct. 3, 2016, 24 pages.
"Non-Final Office Action Issued in U.S. Appl. No. 14/589,513", dated Apr. 22, 2016, 20 Pages.
"Notice of Allowance Issued in U.S. Appl. No. 14/589,513", dated Jan. 11, 2017, 7 Pages.
"Notice of Allowance Issued in U.S. Appl. No. 14/589,513", dated Mar. 23, 2017, 2 Pages.
"Notice of Allowance Issued in U.S. Appl. No. 14/589,513", dated Apr. 27, 2017, 9 Pages.
"Notice of Allowance Issued in U.S. Appl. No. 14/589,513", dated Aug. 7, 2017, 2 Pages.
"Application as Filed in U.S. Appl. No. 15/268,269", filed Sep. 16, 2016, 40 Pages.
Yeom, et al., "Design of Holographic Head Mounted Display Using Holographic Optical Element", In Proceedings of the IEEE 11th Conference on Lasers and Electro-Optics Pacific Rim, vol. 3, Aug. 24, 2015, 2 Pages.
Bleha, et al., "Binocular Holographic Waveguide Visor Display", in SID Symposium Digest of Technical Papers, vol. 45, Issue 01, Jun. 2014, 4 Pages.
Burt, Jeff, "Intel Buys Smart Eyewear Maker Composyt", Retrieved from <<http://www.eweek.com/blogs/first-read/intel-buys-smart-eyewear-maker-composyt>>, Jan. 21, 2015, 4 Pages.
Chuan, et al., "Holographic Projection Using Converging Spherical Wave Illumination", In Proceedings of Seventh International Conference on Image and Graphics, Jul. 26, 2013, pp. 761-765.
Goetz, et al., "Holographic Display System for Restoration of Sight to the Blind", In Journal of Neural Engineering, vol. 10, Issue 5, Oct. 2013, 23 Pages.
Guenter, et al., "Foveated 3D Graphics", In Journal of ACM Transactions on Graphics, vol. 31, Issue 6, Nov. 2012, 10 Pages.
Huebschman, et al., "Dynamic Holographic 3-D Image Projection", In Journal of Optics Express, vol. 11, Issue 5, Mar. 10, 2003, 9 Pages.
Kaczoroski, et al., "Adaptive, Spatially-Varying Aberration Correction for Real-Time Holographic Projectors", In Journal of Optics Express, vol. 24, Issue 14, Jul. 5, 2016, 15 Pages.
Kessler, Dave, "Optics of Near to Eye Displays (NEDs)", Retrieved from <<http://www.kessleroptics.com/wp-content/pdfs/Optics-of-Near-to-Eye-Displays.pdf>>, Feb. 19, 2013, 37 Pages.
Khorasaninejad, et al., "Metalenses at Visible Wavelengths: Diffraction-Limited Focusing and Subwavelength", Retrieved from <<http://projects.iq.harvard.edu/files/muri_metasurfaces/files/1190.full_pdf>>, Jun. 3, 2016, 6 Pages.
Kress, et al., "A Review of Head-Mounted Displays Technologies and Applications for Consumer Electronics", In Proceedings of SPIE—The International Society for Optical Engineering, May 2013, 13 Pages.
Laing, Roger, "Glass, What Glass? Intel Snaps up Swiss Eyewear Startup", Retrieved From: <<http://www.zdnet.com/article/glass-what-glass-intel-snaps-up-swiss-eyewear-startup/>>, Jan. 21, 2015, 4 Pages.
Lanman, et al., "Near-Eye Light Field Displays", In ACM SIGGRAPH Emerging Technologies, Article No. 11, Jul. 21, 2013, 10 Pages.
Lee, et al., "See-Through Light Field Displays for Augmented Reality", In Proceedings of the SIGGRAPH ASIA Virtual Reality Meets Physical Reality: Modeling and Simulating Virtual Humans and Environments; Article No. 3, Dec. 5, 2016, 2 Pages.
Li, et al., "Holographic Display for See-Through Augmented Reality Using Mirror-Lens Holographic Optical Element", In Optics Letter, vol. 41, Issue 11, Jun. 1, 2016, 4 Pages.
Nahar, et al., "Efficient Free-Space Coupling to LMA-PCF by Aberration Correction", In IEEE Transactions on Components, Packaging, and Manufacturing Technology, Oct. 2011, 6 Pages.
Oh, et al., "Achromatic Diffraction from Polarization Gratings With High Efficiency", In Optics Letter, vol. 33, Issue 20, Oct. 15, 2008, 3 Pages.
Palima, et al., "Wave-Guided Optical Waveguides", In Journal of Optics Express, vol. 20, Issue 3, Jan. 13, 2012, 11 Pages.
"International Search Report and Written Opinion Issued in PCT Application No. PCT/US2015/021922", dated Jun. 2, 2015, 10 Pages.
"International Preliminary Report Issued in PCT Application No. PCT/US2015/068208", dated Mar. 22, 2017, 7 Pages.
"International Search Report and Written Opinion Issued in PCT Application No. PCT/US2015/068208", dated May 17, 2016, 13 Pages.
"Second Written Opinion Issued in PCT Application No. PCT/US2015/068208", dated Dec. 14, 2016, 4 Pages.
"International Preliminary Report on Patentability Issued in PCT Application No. PCT/US2016/039142", dated Oct. 16, 2017, 12 Pages.
Qu, et al., "Image Magnification in Lensless Holographic Projection using Double-Sampling Fresnel Diffraction", In Journal of Applied Optics, vol. 54, Issue 34, Nov. 24, 2015, 4 Pages.
Yeom, et al., "3D Holographic Head Mounted Display using Holographic Optical Elements with Astigmatism Aberration Compensation", In Journal—Optics Express, vol. 23, Issue 25, Dec. 2015, 10 Pages.
Paschotta, R., "Volume Bragg Gratings" Encyclopedia of Laser Physics and Technology, vol. 1, Jul. 31, 2016, 3 Pages.
IPEA European Patent Office, Second Written Opinion Issued in PCT Application No. PCT/US2016/039142, dated Mar. 31, 2017, WIPO, 7 pages.

\* cited by examiner

HOLOGRAPHIC NEAR-EYE DISPLAY

BACKGROUND

A near-eye display device may be implemented as a head-mounted display system that allows users to view holographically-generated images as an immersive experience. Images displayed/projected by a near-eye display device may be produced in various manners. For example, near-eye reality display devices may utilize display panels positioned within a user's field of view, while others may utilize waveguides to deliver to a user's eyes imagery produced elsewhere in the system.

SUMMARY

Examples are disclosed that relate to holographic near-eye display systems. One example provides a display device including a phase modulating image producing panel, and a holographic optical element configured to receive collimated light and to output converging light toward the phase modulating image producing panel, the phase modulating image producing panel being configured to use at least a portion of the converging light to produce an image with collimated or diverging light.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Optical systems for near-eye display systems, such as head-mounted display (HMD) devices, may suffer from various drawbacks. For example, HMDs that utilize conventional optics may provide a wide field of view and a large eyebox in which imagery is viewable, but also may be bulky and heavy. HMDs that utilize waveguide optics to deliver to a user's eye an image produced by a panel located out of the user's field of view may allow the use of a relatively thin lens, but can have a small field of view for virtual image display, and can also be heavy. Also, as the light bounces in the waveguide many times, the waveguide has to be of high manufacturing fidelity. Scanning mirror or scanning fiber devices, in which the direction of projected light can be mechanically controlled to produce a scanned image, may be lightweight and compact, but the eyebox and the field of view of such devices each may be smaller than those of waveguide or conventional optical systems.

Accordingly, examples of near eye displays of compact size that may display virtual imagery with a wide field of view and a wide effective eyebox are disclosed herein. Briefly, a near-eye display device may utilize a holographic optical element that receives collimated light from a light source and outputs converging light toward a phase modulating image producing panel, such as a phase modulating LCOS (liquid crystal on silicon) panel. The phase modulating image producing panel may be controlled to form a hologram that produces an image with collimated or diverging (e.g., weakly diverging) light for display to a user. In some examples, to reduce a data processing load, the image producing panel may be effectively divided into a plurality of holograms ("tiled holograms"), each of which collimates the converging light from the holographic optical element and contributes to the creation of the image. By returning the light to parallel rays, the image producing panel is able to compensate for the lens effect of the holographic optical element. The use of converging light incident on the LCOS allows the resolution to be reduced for the holograms of the LCOS, as less resolution is spent bending the light toward the eye than if the hologram were illuminated with parallel light. In some examples, color filters may be placed on top of hologram pixels for achieving non-sequential color operation.

Further, to conserve computing device resources, a foveated image display may be used to display higher resolution imagery adjacent to the gaze direction of a user, and lower resolution imagery peripheral to the gaze direction. Foveation of displayed imagery may be accomplished in various manners. For example, where tiled holograms are used, the resolution of each hologram may be controlled based upon a determined gaze direction of a user, such that a resolution may be increased for hologram tiles closer to a user's gaze direction and decreased for hologram tiles that are peripheral to the gaze direction. The resolution of the projected image is controlled by the size of the tile while the angular extend of the image is determined by the pixel spacing, which is the same for all the tiled holograms irrespective of their size.

Alternatively or additionally, light output by the phase modulating image producing panel (e.g. light that is not diffracted but is merely reflected or collimated by the phase modulating image producing panel) may be used to illuminate a second image producing panel, such as an amplitude modulating panel, to display additional imagery. The second display panel also may be used for modifying the image displayed by the first image producing panel, e.g., to correct aberrations in the image or to mask unwanted artifacts. In this way, the near-eye display may avoid the use of curved refractive optics, thereby allowing the optical system to achieve a compact profile. The above-described features, as well as others, are described in greater detail below.

Figure 1:
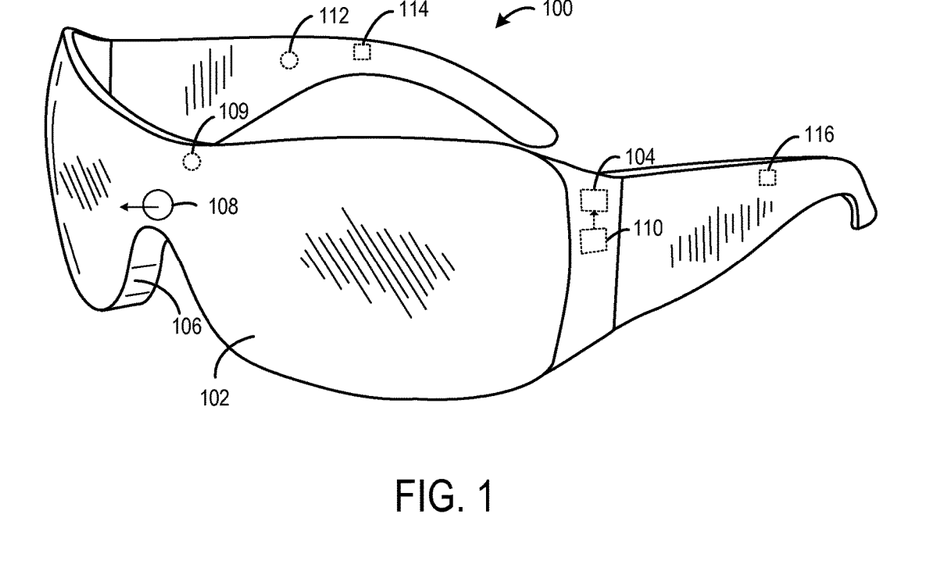
FIG. 1 shows an example near-eye display device.

FIG. 1 shows an example near-eye display device that may include one or more of the example optical systems described herein. More particularly, FIG. 1 shows an example head-mounted display (HMD) device 100 in the form of a pair of wearable glasses with a near-eye display 102. While disclosed herein in the form of an occluding, virtual reality system, the concepts disclosed herein also may be used with an augmented reality system utilizing see-through display to enable viewing of displayed imagery in combination with a real-world background. A near-eye display device may take any other suitable form than the example shown.

The HMD device 100 includes a controller 104 configured to control operation of the display 102. Control of operation of the display 102 may be additionally or alternatively controlled by one or more computing devices (e.g., remote from the HMD device 100) in communication with the HMD device 100. The controller 104 may include a logic device and a storage device, as discussed in more detail below with respect to FIG. 7. The logic device and storage device may be in communication with various sensors and display system components of the HMD device 100.

The HMD device 100 also includes a holographic display system 106 controlled by the controller. Example display systems for use as holographic display system 106 are described in more detail below.

The HMD device 100 further may include various sensors and related systems to provide information to the controller 104. Such sensors may include, but are not limited to, a microphone array, one or more outward facing image sensors 108, one or more inward facing image sensors 109, and an inertial measurement unit (IMU) 110.

The one or more outward facing image sensors 108 may be configured to capture visual data of the physical environment in which the HMD device 100 is located. Such visual data of the physical environment may be used to provide video-based augmented reality display data to the holographic display system 106. In this way, a live or semi-live video/image feed of the user's real-world environment, as imaged by the outward facing image sensors 108, may be displayed via the holographic display system 106 to simulate a see-through display system. Virtual objects may be displayed over the images of the real-world environment to present an augmented reality scene to the user.

The one or more inward facing image sensors 109 may be configured to capture visual data corresponding to a user of the HMD device 100. For example, the one or more inward facing image sensors 109 may be included in an eye tracking system to capture image data of a user's eye for determining a user's gaze direction. The determined gaze direction may be utilized to determine an intersection between the user's gaze direction and the display device (e.g., the image producing display panel), and thus to determine which region of the display panel is within a foveal region of the user's field of view and which region of the display panel the user is viewing within a peripheral region of the user's field of view.

The HMD device 100 may further include speakers 114 and 116 configured to output sound to the wearer of the HMD device. The speakers 114 and 116 may be positioned on each side frame portion of the HMD device proximate to the wearer's ears.

Figure 2:
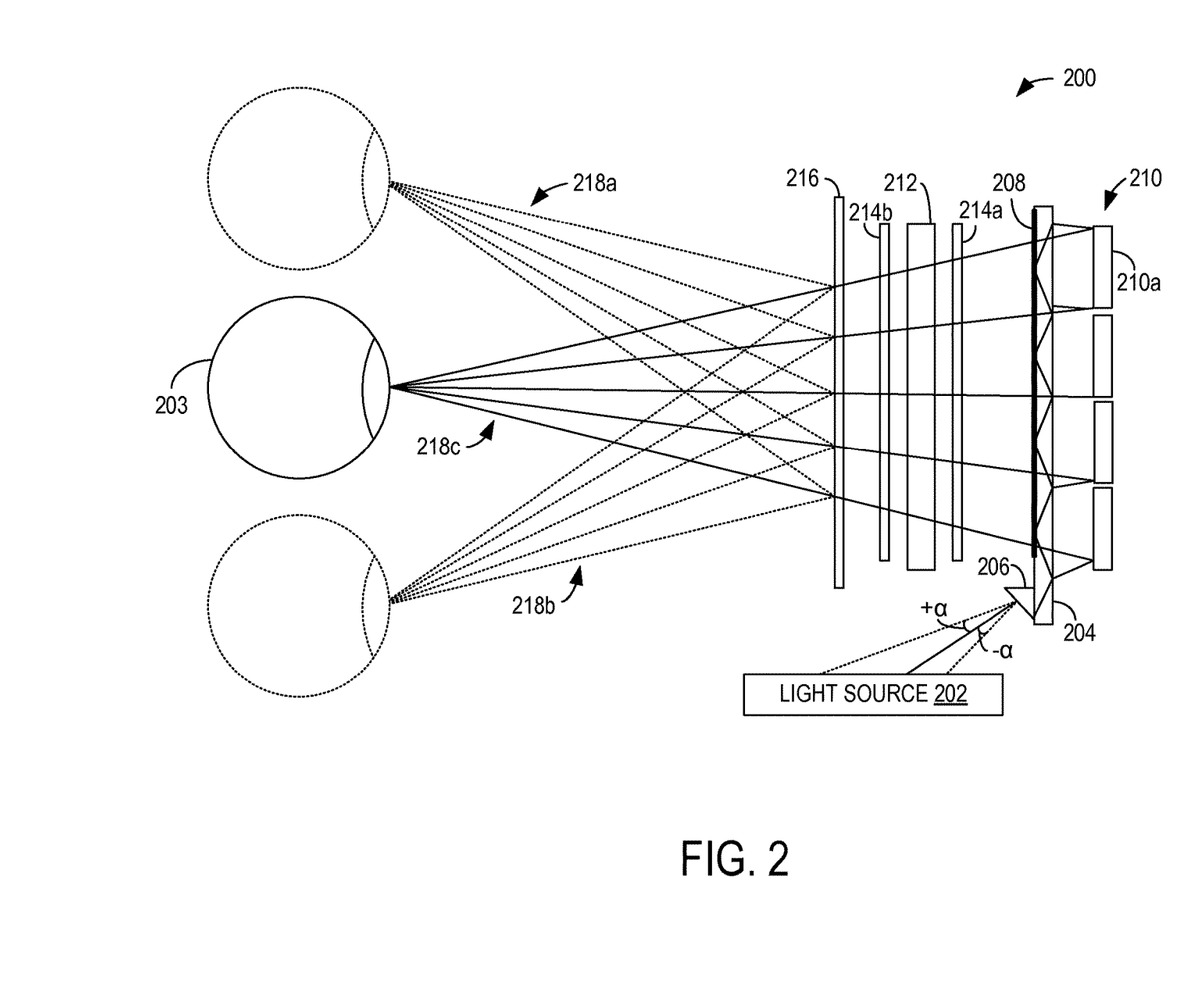
FIG. 2 shows an example optical system for a near-eye display device.

FIG. 2 shows an example optical system 200 that may be used as holographic display system 106 for HMD device 100 of FIG. 1, or any other suitable near-eye display. The optical system includes optical elements arranged in front of or near an eye 203 of a user of the display device. Optical system 200 includes a light source 202 configured to output spatially coherent light toward a waveguide 204 (e.g., via input coupling prism 206, embossed grating, volume hologram, slanted diffraction grating, or other coupling grating or hologram), which illuminates a holographic optical element 208. The holographic optical element 208 converges the light and directs the converging light onto a phase modulating image producing panel 210, such as a phase-modulating LCOS panel. As illustrated, phase modulating image producing panel 210 may be effectively broken into a plurality of digital holograms (e.g., hologram 210a), which will be described in more detail below with respect to FIGS. 3, 4A, and 4B. Each digital hologram may be responsible for forming part of the image using the light diffracted by the phase modulating image producing panel 210. The phase modulating image producing panel 210 may form the plurality of digital holograms by dividing up a single image producing panel into multiple logical regions and/or by providing multiple separate image producing panels.

Light is reflected (zero order) and diffracted (first order and higher orders) from the phase modulating image producing panel 210 and transmitted through the holographic optical element 208. The phase modulating image display panel 210 produces a viewable image typically via first order diffracted light. Some implementations of the display system may be configured to use other orders of diffracted light. Further, the phase modulating display panel 210 also may be controlled to convert the converging light from the holographic optical element 208 back to collimated light. In contrast, the zero order light remains converging, reflected by the phase modulating display panel 210, will not appear as a bright spot in the users field of view (as it would if collimated), but rather will appear as being substantially uniform in intensity across the eyebox.

In view of this, the optical system 200 may optionally include an amplitude modulating spatial light modulator 212 (e.g., an LCD panel) to produce additional imagery via the reflected light from the phase modulating device. Undiffracted light (including the unwanted zero order light) will appear as a uniform brightness image to the user. Turning certain hologram tiles intentionally off or displaying an appropriate phase pattern may create the desired backlight for the amplitude modulating spatial light modulator 212. Where the spatial light modulator 212 comprises a transmissive LCD, the optical system further may include polarizers 214a and 214b to respectively polarize and filter the light passing through the spatial light modulator 212 in order to achieve amplitude modulation.

The amplitude modulating spatial light modulator 212 may be used to produce any suitable imagery. For example, the spatial light modulator 212 may be controlled to produce an image in a peripheral region of a user's vision. Such an image may be a lower resolution image than the phase modulating image producing panel 210, and/or may be displayed across a wider field of view than the image from phase modulating image producing panel 210. This may help to reduce the computational burden compared to presenting peripheral and foveal images via the phase modulating image producing panel 210. In other examples, the spatial light modulator 212 may be controlled to produce an image within the same field of view as the phase modulating image producing panel 210 to affect the appearance of the image produced by panel 210. For example, the spatial light modulator 212 may be used to attenuate the image from the image producing panel 210 to reduce the intensity of bright spots and/or to perform other image corrections.

In some examples, the light reflected and diffracted from the phase modulating image producing panel 210 and/or the light output by the spatial light modulator 212 may be provided to a diffractive optical element 216 (e.g., a fanout grating in one non-limiting example) to replicate the exit pupil of the optical system. This may help to create an effectively larger eyebox. The replicated eyeboxes (e.g., formed by light rays 218a and 218b) may be spatially separated from the original eyebox (e.g., formed by light rays 218c) in order to ensure that a user views a single eyebox at a given eye position/gaze direction.

In some examples, an eye-tracking system may be used to determine or track a pupil position of a user's eye. In such examples, the multiple eyeboxes may be formed by using a lower frequency switchable grating and an adjustable light source controllable to emit light at different angles based on a location of the pupil. For example, as illustrated in FIG. 2, the light source 202 may be controllable to emit light in a range of angles from −α to +α, wherein α may have any suitable value. As one non-limiting example, the light source may be controllable from −10 to +10 degrees from a center of the angular range, and the eyeboxes produced by the diffractive optical element 216 may be angularly spaced by 20 degrees.

Because a hologram encodes information in the frequency domain, each hologram pixel of a hologram tile contributes to an entire section of the FOV/image. The size of the image (e.g., the angular extend of the image) depends on the pixel spacing and the encoded lens in the holographic optical element. The pixel density of the image (e.g., the angular separation of the image pixels) depends on the hologram pixels (e.g., the hologram tile size). Therefore, it is possible to increase or decrease the angular density of image pixels with a corresponding increase or decrease in the fidelity of the image while keeping the pixel spacing of the hologram and/or phase modulating device constant. It is also possible to create gaps in the hologram. As long as the gaps are significantly smaller than the pupil of the eye, and the eye is sufficiently close so it cannot focus on these gaps, the eye will not perceive them. These gaps may be non-existing pixels, pixels that are not switched on, pixels covered with a color mask, or may take any other suitable form. These gaps may be used for passing the addressing lines and thus improving the scalability of the device.

Figure 3:
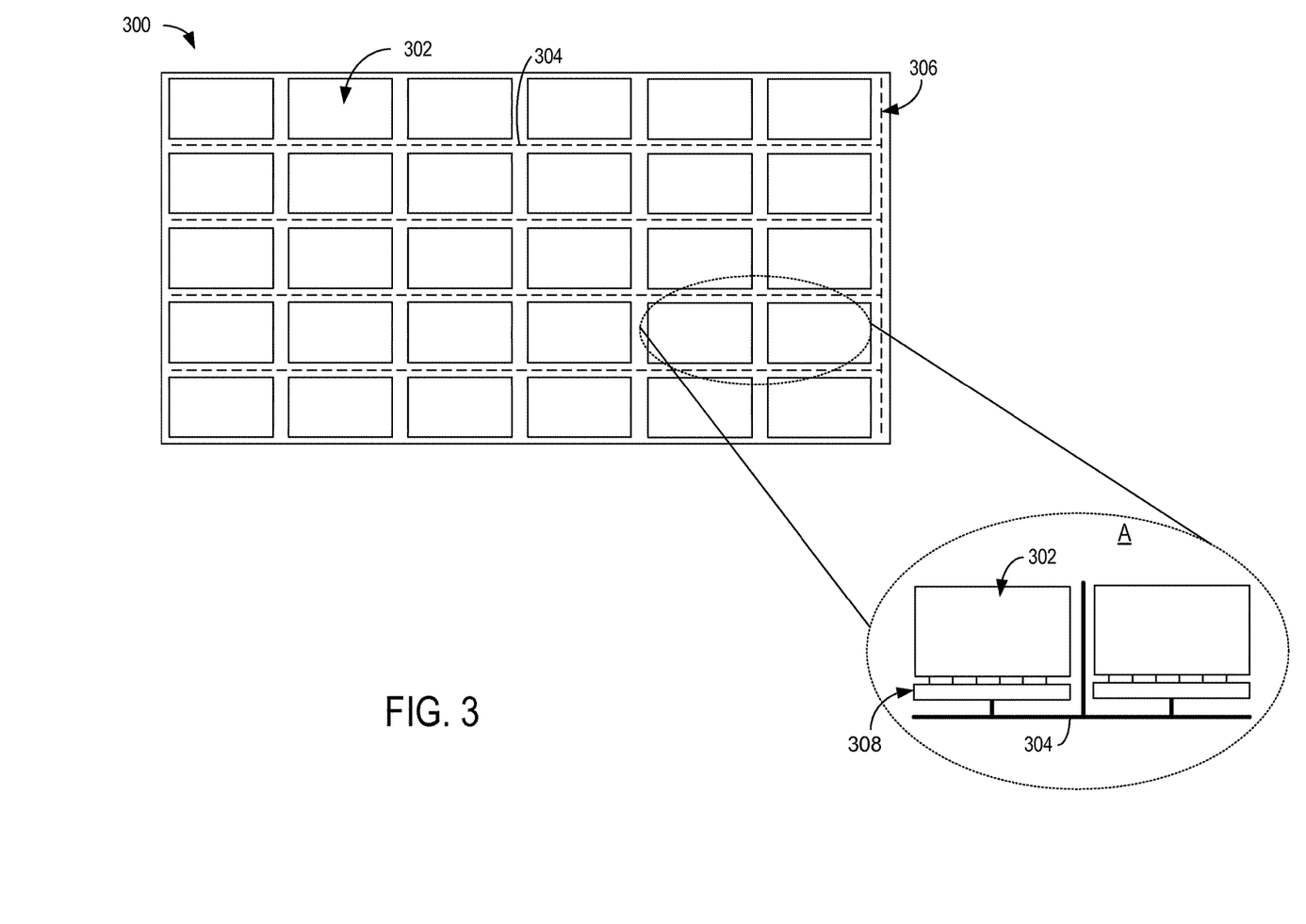
FIG. 3 shows a schematic depiction of a phase modulating image producing panel arranged as a plurality of tiled holograms.

Accordingly, FIG. 3 shows an example phase modulating image producing panel 300 comprising a plurality of tiled holograms 302 defined by gaps, with addressing lines 304 of a bus 306 located within the gaps. The panel may include a large number of smaller panels (e.g., LCoS devices), which may be formed on the same substrate or may each be formed on separate substrates and then integrated on a large substrate, such as a printed circuit board. The panel may also be placed on a curved waveguide (e.g. section of a cylinder) and thus increasing the FOV while at the same time operating the phase modulating device closer to normal incidence. Because the Fourier domain or conjugate plane of an image may be created without the use of additional optics, the digital holograms do not interface directly with any lenses, which allows the display panel to maintain a flat and thin configuration without bulky curved components. Such features may help to reduce the overall depth of the optical system to maintain a compact configuration.

Providing addressing lines within the gaps may enable the device to be scalable to accommodate additional or fewer holograms. A non-limiting example of hologram-to-gap sizing may include a hologram that has a length of 5.4 mm and a height of 3 mm, separated from adjacent holograms via a gap that is approximately 0.5 mm in width or height. Such an aspect ratio of the hologram may correspond to a high resolution image of 1920 pixels by 1080 pixels with a 2.79 µm pixel pitch. The elements described above are presented for example, and other sizes, numbers, and/or arrangements of holograms may be utilized in a tiled phase modulating image producing panel system. For example, to produce 720p images, each hologram may be sized to accommodate a maximum of 1280×720 pixels.

Gaps in the panel may enable more effective addressing schemes than panels without gaps between holograms. For example, the addressing limitations of an N×N device with 2N external connections are reduced if the device is divided into four smaller ones of N/2×N/2 pixel devices. As mentioned above, by creating gaps between groups of pixels, addressing lines can be placed between them and electronics to convert serial data into parallel that will then drive the device. As shown in the detail view A of FIG. 3, the addressing lines may be connected to each corresponding hologram via a demultiplexer 308. The bus 306 may provide all display data to all holograms in parallel as multiplexed information, and the demultiplexer 308 may provide the relevant data to an associated hologram. In other examples, the data distributed by bus 306 above may instead be provided by an h-tree, a routed on-chip interconnect, a pipelined distribution tree, or any other suitable interconnect. In either case, the total amount of information transmitted to the panel may be reduced relative to panels without individually addressable holograms. By individually addressing each hologram, the amount of data associated with an image portion presented by that hologram may be controlled to effectively increase or reduce the resolution of that portion of the image. For example, as an eye of a user of the display device moves around to focus on different parts of a produced image, portions of the image in a central (e.g., foveal) region of the user's vision may display a larger hologram that increases the image resolution relative to portions of the image outside of the foveal region. In this way, by increasing or decreasing the size of each hologram tile, the resolution of the portion of the image presented at each angle by each hologram may be dynamically controlled.

Figure 4A:
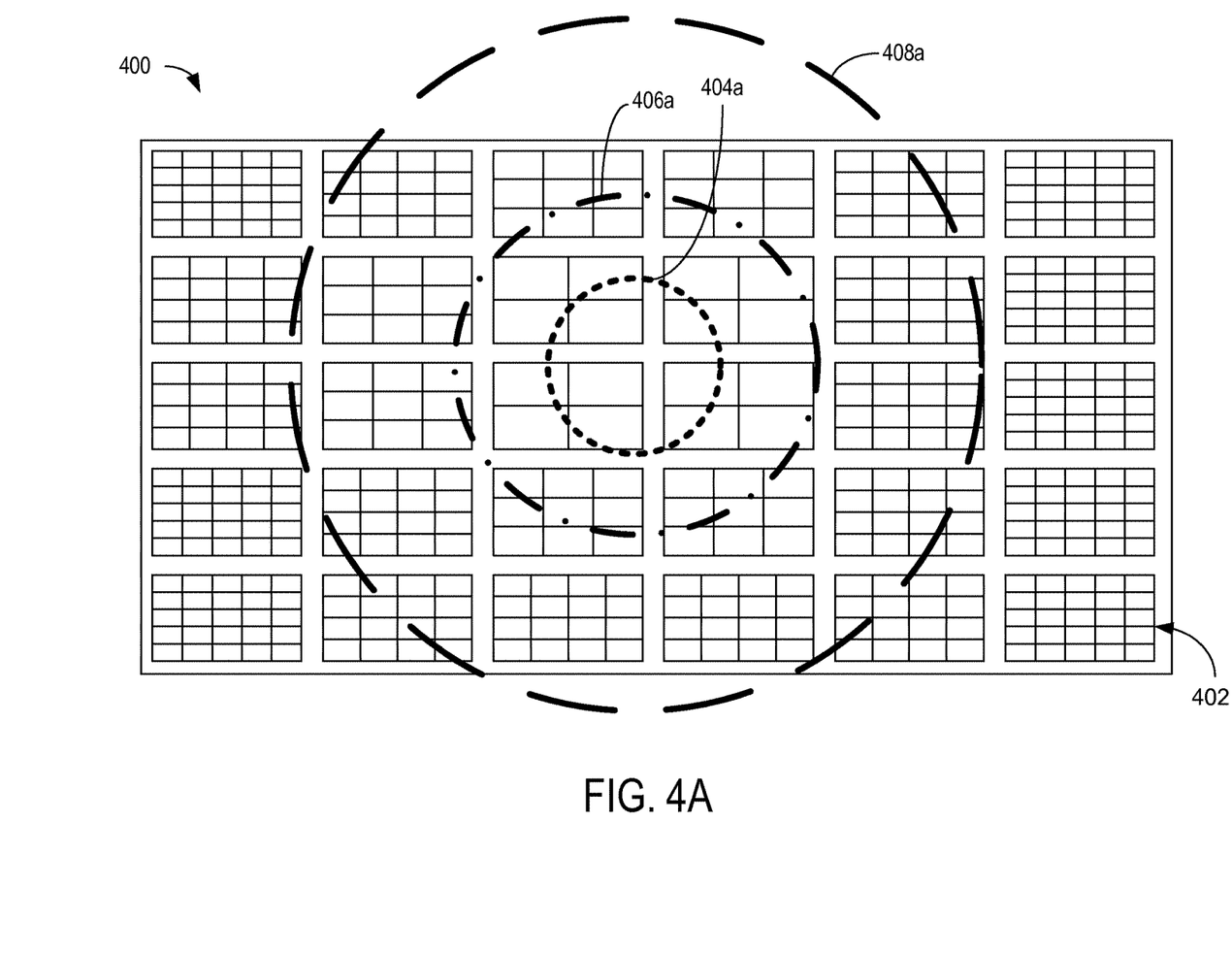
FIGS. 4A and 4B illustrate modifying the resolution of tiled holograms based on a gaze direction.
Figure 4B:
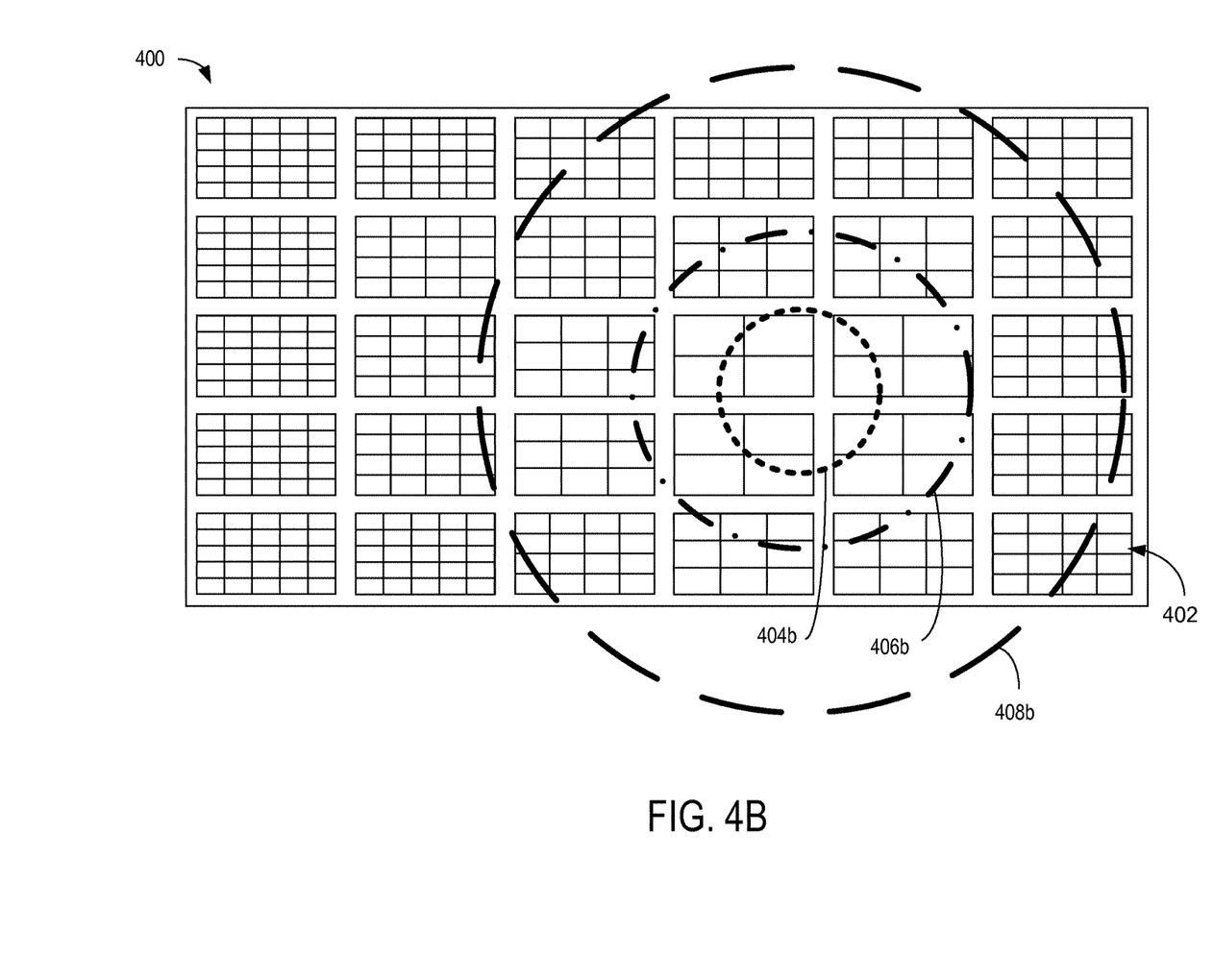

FIGS. 4A-4B illustrate modifying tiled hologram sizes (and the subsequent increase or decrease of the image resolution) based upon gaze direction. In these figures, an amount of visual detail encoded in each hologram tile is represented by a size of boxed regions in the tile, wherein a larger number of smaller boxes represents less visual information, and a smaller number of larger boxes represents more visual information. The number of boxes represents the amount of duplicated information in the form of repeated holograms in that tile. Thus, larger holograms with less duplicated information may be used for the foveal viewing region while smaller holograms with more duplicated information may be used for the peripheral view. The bus or other data interconnect sends all the information to all the sub-pixel blocks and each block reads the information it utilizes (e.g., the information addressed to that block). As the bus may contain significantly less information than if each pixel was individually addressed, the bandwidth of the device may be reduced.

A user's visual field is represented by the three circles in FIG. 4A. The user's visual field may be centered at an intersection between a gaze direction and the display device/display panel, and regions of the visual field may be selected based on a calibration or a default setting indicating typical edges of vision range (e.g., a region in which a user is able to focus most clearly, out to a peripheral region of the user's vision). For example, an area inside innermost circle 404a may correspond to a central or foveal region of the user's vision. An area inside middle circle 406a but outside of innermost circle 404a may correspond to an intermediate region of the user's vision. An area inside outermost circle 408a but outside of innermost circle 404a and middle circle 406a may correspond to a peripheral region of the user's vision. The granularity, shape, and size of the depicted visual regions is presented for example and is not intended to be limiting in any manner. Further, the description of the areas as corresponding to foveal, intermediate, and peripheral regions is illustrative, and hologram areas may not correspond anatomically to these visual regions in various examples.

As illustrated in FIG. 4A, holograms that fall within the foveal visual region are controlled to produce image portions having a relatively higher resolution. As the distance between a given hologram and the central/foveal visual region grows, the resolution of that hologram declines. For example, holograms outside of the outermost circle 408a are controlled to produce image portions having a relatively lower resolution (e.g., the lowest resolution of the holograms and/or a minimum resolution of the panel). As illustrated, some holograms may overlap intersections between visual regions. In the illustrated example, the resolution of each tiled hologram is based on the closest region to the foveal region in which that hologram is located. Accordingly, if a hologram is located in both the foveal region and the intermediate region, the hologram is used to produce an image portion having a resolution associated with the foveal region (e.g., a high resolution). However, in other examples, the resolution may be based on the furthest region to the foveal region in which the hologram is located.

As the eye moves, the resolution provided by the different holograms may change if the visual region in which that hologram is located changes. FIG. 4B illustrates movement of a location of intersection between the user's gaze direction and the display device/panel 400. In response to the movement, the resolution of hologram tiles changes to move the foveal/intermediate/peripheral regions, and thereby increase or decrease the resolutions of the hologram tiles accordingly. In this manner, the system maintains the higher resolution imagery in the foveal area of the holograms, while decreasing resolution outside of this area to reduce computational resource usage.

Phase modulating liquid crystal (LC) devices are typically slower than similar amplitude modulating devices, as a ~2π phase delay is encountered for phase modulation in contrast to ~π for polarization (and thus amplitude) modulation. As the thickness of an optical system increases, speed reduces, making color sequential displays potentially more difficult to achieve. One approach into solving this issue is to use color filters on top of each hologram pixel. However, unlike conventional display devices, the red, green, and blue filters may not be placed on a regular array, as placing color filters on a regular array may effectively reduce the spatial frequency of the hologram and therefore its deflection angle. Furthermore, any additional repetitive patterns will introduce persistent unwanted artifacts in the image. Instead, filters may be arranged in a pseudo-random way on the display device so they can still access all the angles. For example a 3 megapixel (MPix) device can have 1Mpix red, 1Mpix green and 1Mpix blue filters. In this case, efficiency is reduced as, at any moment, only one third of the light is transmitted through the color filters. Thus, another possible way to display color images may be to use many smaller blocks of pixels, where each block is illuminated by a single color. This may help to avoid a loss in efficiency, but may pose challenges in light of the potentially sub-mm size of the blocks.

Figure 5:
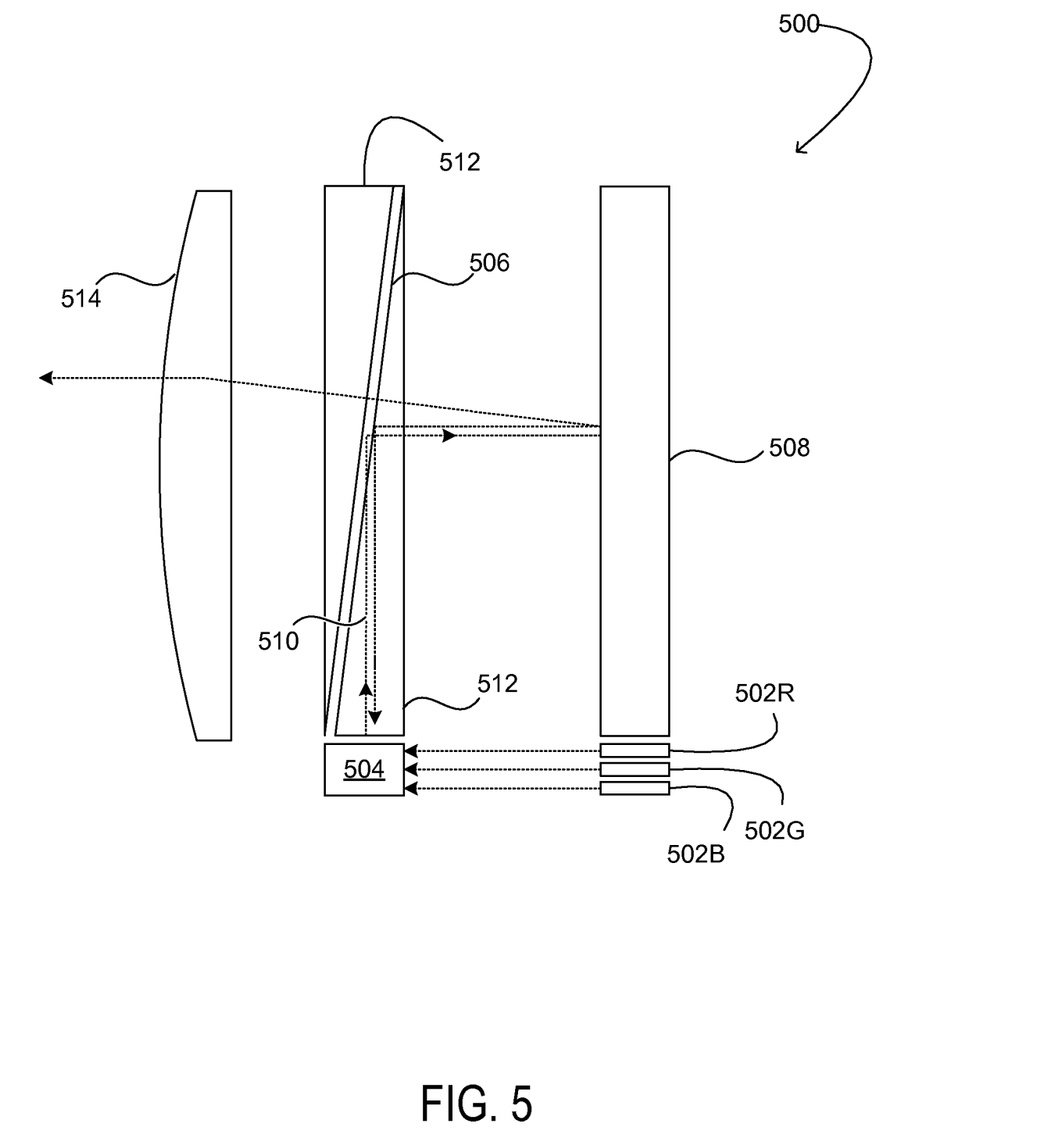
FIG. 5 shows another example optical system for a near-eye a display device.

The use of tiled hologram resolution control to display foveated images can be used with any suitable optical system other than that of FIG. 3. FIG. 5 shows an example optical system 500 that utilizes a volume hologram to deliver light to a phase modulating image panel. Optical system 500 also may be utilized with the display device of FIG. 1. Optical system 500 includes a coherent illumination source 502 comprising a red laser 502R, a green laser 502G, and a blue laser 502B. More generally, coherent light may be emitted from a number of sources including single mode lasers, multimode lasers, superluminescent diodes (SLDs) and even certain LEDs. Fully coherent light may not be used in all cases, but the spatial and temporal coherence may be controlled such that light can be diffracted and form an image. The beams from each laser are combined in beam-conditioning optic 504, which aligns the beams along the same optical axis and adjusts the exit pupil of the aligned beams to the desired geometry. In one implementation, the beam may be relatively long and narrow—e.g., 20×2 millimeters (mm) in cross section—with the long edge parallel to the illuminated face of a volume hologram 506 and to the illuminated face of the image-forming optic 508. In one implementation, the short edge of the beam may be normal to the illuminated face of the image-forming optic, though other geometries are contemplated as well. Combined use of red, green, and blue lasers in the coherent illumination source enables a color image to be formed at image-forming optic 508. In other implementations, a monochromatic image may be desired. As such, the coherent illumination source may include a single laser. In general, the coherent illumination source may include lasers of any suitable wavelength (infrared, near-infrared, ultraviolet) and provide a substantially flat wave front for each wavelength.

The volume hologram 506 is configured to receive coherent incident light 510 and to redirect the coherent light into the image-forming optic 508. In some examples, at least some image content may be encoded in incident light 510 that illuminates image-forming optic 508. There, the role of the image-forming optic may be to change some property of the encoded image—its position, focal plane, orientation, brightness, polarization state, or correct for optical aberrations, etc. In other examples, the incident light may provide neutral (e.g., non-image carrying) illumination of the image-forming optic, whose role is to form the desired image by releasing an engineered or controlled reflection.

The volume hologram 506 may take any suitable arrangement. In one example, the volume hologram 506 may include a plurality (e.g., three) of different Bragg gratings arranged in parallel layers (e.g., each Bragg grating diffracting a different wavelength of light, such as the red, green, and blue light from the associated lasers 502R/G/B). Each Bragg grating may include a series of substantially planar regions of a first refractive index, arranged in parallel in a substrate material of a second refractive index, higher or lower than the first. Each Bragg grating may efficiently reflecting light of a narrow range of wavelengths when such light is received over a narrow range of incidence angles. Light received outside of the narrow wavelength and incidence-angle ranges is transmitted with high efficiency. Moreover, the wavelength and incidence-angle ranges are selectable, being determined by the orientation and pitch of planar regions, which are 'burned in' during recording of the volume hologram. In particular, the angle of release of the diffracted rays is determined by the period of the Bragg grating, while the angle of the rays that will excite the grating is determined by the direction of the grating vector. Furthermore, angular selectivity increases with the thickness of the Bragg grating; a thickness of 25-100 microns may provide an angular sensitivity of one degree.

The fact that each Bragg grating may be transparent to light outside of its selected wavelength range makes it possible to combine two, three, or more Bragg gratings in a stacked configuration. In practice, equivalent incidence and reflection angles may be selected for all Bragg gratings (e.g., all three Bragg gratings), so that the stack of Bragg gratings can receive red, green, and blue light in the same beam and reflect all three colors in the same direction, to illuminate the image-forming optic at the same near-normal incidence. In other implementations, different Bragg gratings may be configured to receive light at different incidence angles and to illuminate the image-forming optic at the same or different incidence angles.

As noted above, each Bragg grating redirects the incident beam by an angle determined by its grating period. Therefore, rays may be incident on the image-forming optic at normal or near-normal incidence even though the volume hologram is not oriented 45 degrees to an exit pupil, as a conventional beam splitter would be. This feature may help to reduce the depth of the optical system, potentially by orders of magnitude, relative to other optical systems.

While the stacked Bragg-grating configuration described above may be used in some implementations, it is also possible to record two, three, or more Bragg gratings superposed in the same volume, using light of different wavelengths in concurrent or sequential exposures of the photopolymer. In such a hologram, the three superposed Bragg gratings still function independently. Naturally, if a monochromatic image is desired, volume hologram 506 may include a single Bragg grating for that color. Furthermore, other types of volume holographic structures besides Bragg gratings may be used to achieve analogous results. Examples include configurations where the volume hologram incorporates a holographic lens to focus or defocus the incoming or reflected beam.

The Bragg gratings of the volume hologram 506 may be transparent outside of the narrow range of angles in which incident light is diffracted. For the light reflecting from image-forming optic 508, the narrow range may be centered on an optical axis, where the incidence and observation angles are equal. Accordingly, an exit pupil of the image-forming optic 508 will appear unobstructed to the observer, except in the neighborhood of a central optical axis, and parallel observation axes, where the volume hologram diverts the reflected image light back in the direction of coherent illumination source 502. In practice, image rays may be rejected over a small range of angles, both horizontal and vertical, relative to the incidence angle or over a large range of angles.

Diversion of the reflected image light provides an efficient and highly selective mechanism to separate the zero order diffraction component of an image formed by a holographic image source, but also may create a small dark spot in the middle of the image. To remedy such issues, the phase-modulating display panel 508 may be configured to encode a Fresnel lens or other aberration. In some examples, an effect of the aberration is to shift the focal plane of the formed image. Although such an optic will release numerous rays parallel to the zero-order component, all rejected by volume hologram 506, the rejected rays will now originate from all portions of the image, instead of one cluster in the middle of the image. Thus, the image content is protected at the expense of a minor reduction in brightness and contrast. By definition, the zero-order component experiences none of the phase modulation induced by the image-forming optic, and therefore is not diverted by a holographic Fresnel lens or other aberration. Thus, removal of the unwanted zero-order illumination reflection remains efficient.

FIG. 5 also shows that the volume hologram may be sandwiched between a pair of thin-layer prisms 512. The prisms may be index-matched to the grating material to avoid Fresnel reflections from substrate material of the volume hologram. As an alternative, the volume hologram may include an antireflective coating—e.g., an interference filter. A physical lens 514 (e.g., a refractive or diffractive lens) may optionally be positioned in front of volume hologram 506 in some examples. The physical lens, depending on its focal length and other properties, may be configured to shift the focal plane of the formed image back to its original position, or to shift it further in the same direction as the encoded Fresnel lens. In some aspects, physical lens 514, the sandwiched volume hologram 506, and image-forming optic 508 may be integrated into the same optical component. The above example of an optical system including a holographic optical element is exemplary in nature, and any suitable holographic optical element and associated optical configurations may be utilized.

Figure 6:
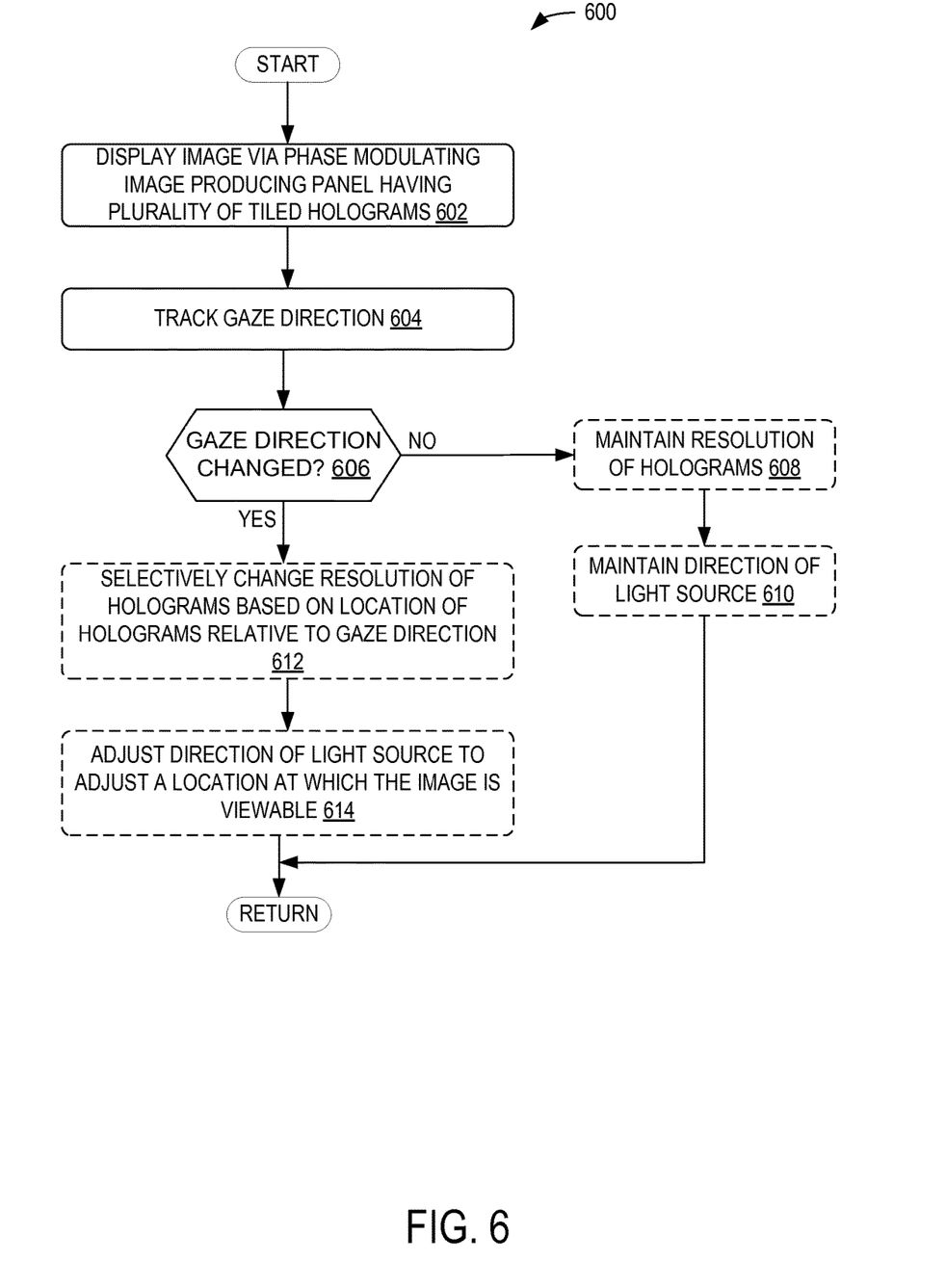
FIG. 6 shows a flow chart illustrating an example method of producing images.

FIG. 6 is a flow chart illustrating an example method 600 of displaying images via a holographic near-eye display device, such as an HMD device utilizing optical system 200 of FIG. 2. At 602, method 600 includes displaying an image via a phase modulating image producing panel configured as a plurality of tiled holograms. At 604, method 600 includes tracking a gaze direction of a user, for example, via an eye-tracking system of an HMD device, and at 606, determining if the gaze direction has changed (e.g., by a threshold amount from a last measured gaze direction). For example, it may be determined whether a location of gaze intersection between the gaze direction and the display (e.g., the tiled holograms), has changed.

If the gaze direction has not changed (e.g. more than a threshold amount), then method 600 comprises one or more of maintaining, at 608, a resolution of the holograms and/or maintaining, at 610, a direction at which light is emitted from a directable light source to maintain a location of higher resolution imagery and/or an eyebox. On the other hand, if the gaze direction has changed (e.g., more than a threshold amount), then method 600 comprises one or more of selectively changing, at 612, a resolution of holograms based on the location of the holograms relative to the gaze direction and/or adjusting, at 614, a direction of the light source to adjust a location at which the image is viewable, respectively.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
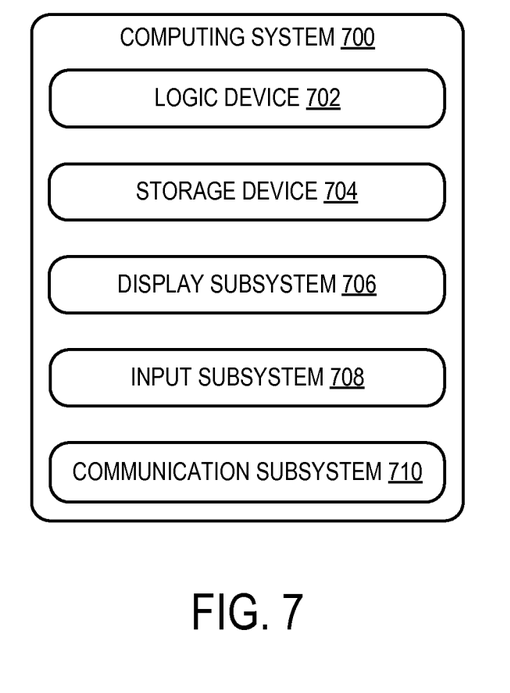
FIG. 7 shows a block diagram of an example computing system.

FIG. 7 schematically shows a non-limiting embodiment of a computing system 700 that can enact one or more of the methods and processes described above. Computing system 700 is shown in simplified form. Computing system 700 may take the form of one or more wearable devices (e.g., near-eye display devices and/or head-mounted display devices such as HMD 100 of FIG. 1, etc.), personal computers, server computers, tablet computers, home-entertainment computers, network computing devices, gaming devices, mobile computing devices, mobile communication devices (e.g., smart phone), and/or other computing devices.

Computing system 700 includes a logic device 702 and a storage device 704. Computing system 700 may optionally include a display subsystem 706, input subsystem 708, communication subsystem 710, and/or other components not shown in FIG. 7.

Logic device 702 includes one or more physical devices configured to execute instructions. For example, the logic device may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device optionally may be distributed among two or more separate devices, which may be remotely located and/or configured for coordinated processing. Aspects of the logic device may be virtualized and executed by remotely accessible, networked computing devices configured in a cloud-computing configuration.

Storage device 704 includes one or more physical devices configured to hold instructions executable by the logic device to implement the methods and processes described herein. When such methods and processes are implemented, the state of storage device 704 may be transformed—e.g., to hold different data.

Storage device 704 may include removable and/or built-in devices. Storage device 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage device 704 may include volatile, non-volatile, dynamic, static, read/write, read-only, random-access, sequential-access, location-addressable, file-addressable, and/or content-addressable devices.

It will be appreciated that storage device 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic device 702 and storage device 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Display subsystem 706 may be used to present a visual representation of data held by storage device 704. This visual representation may take the form of a graphical user interface (GUI). As the herein described methods and processes change the data held by the storage device, and thus transform the state of the storage device, the state of display subsystem 706 may likewise be transformed to visually represent changes in the underlying data. Display subsystem 706 may include one or more display devices utilizing virtually any type of technology. Such display devices may be combined with logic device 702 and/or storage device 704 in a shared enclosure, or such display devices may be peripheral display devices.

Input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for device vision and/or gesture recognition; a head tracker, eye tracker, accelerometer, and/or gyroscope for motion detection and/or intent recognition; as well as electric-field sensing componentry for assessing brain activity.

Communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

Another example provides a display device including a phase modulating image producing panel, and a holographic optical element configured to receive collimated light and to output converging light toward the phase modulating image producing panel, the phase modulating image producing panel being configured to use at least a portion of the converging light to produce an image with collimated or diverging light. The display device may additionally or alternatively further include an eye-tracking system configured to track a gaze direction of a user of the display device. The display device may additionally or alternatively further include a directable light source controllable to direct light in a direction based upon the gaze direction to adjust a location at which the image is viewable. The display device may additionally or alternatively further include a diffractive optical element configured to form a plurality of spatially separated eyeboxes in which the image is viewable. The phase modulating image producing panel may additionally or alternatively be further controllable to modify a resolution of each of a plurality of portions of the image based on the gaze direction. The phase modulating image producing panel may additionally or alternatively be controllable to produce the image via an array of tiled holograms. Each of the tiled holograms may additionally or alternatively be individually-addressable via addressing lines of a bus, an h-tree interconnect, a routed on-chip interconnect, or a pipelined distribution tree interconnect, and controlling the resolution of each of the tiled holograms may additionally or alternatively include sending higher resolution data to tiled holograms in a foveal vision region than to tiled holograms in another vision region of the display. The array of tiled holograms may additionally or alternatively be formed by providing multiple separate image producing panels that are spaced from one another. The display device may additionally or alternatively further include a spatial light modulator, and the phase modulating image producing panel may additionally or alternatively be configured to reflect converging light of a zero order toward the spatial light modulator for image production. In this example display device, the spatial light modulator may additionally or alternatively be controllable to produce one or more peripheral images configured to surround the image and a correction image configured to selectively attenuate the image. Any or all of the above-described examples may be combined in any suitable manner in various implementations.

Another example provides an example display device including a light source, a phase modulating image producing panel configured to produce a holographic image via light from the light source, an eye-tracking system, a processor configured to execute computer-readable instructions, and a storage device comprising instructions stored thereon that are executable by the processor to track, via the eye-tracking system, a gaze intersection with the display device, control the phase modulating image producing panel to produce an image via an array of tiled holograms formed via the phase modulating image producing panel, the array of tiled holograms comprising a region of higher resolution tiled holograms closer to a gaze intersection and a region of lower resolution tiled holograms farther from the gaze intersection, detect, via the eye-tracking system, a change in the gaze intersection, and control the phase modulating image producing panel to increase a resolution of the region of lower resolution tiled holograms and to decrease a resolution of the region of higher resolution tiled holograms based upon the change in the gaze intersection. Each of the tiled holograms may additionally or alternatively be individually-addressable. Decreasing the image resolution of the region of lower resolution tiled holograms may additionally or alternatively include sending a larger number of replicated copies of smaller tiled holograms in the region of lower resolution holograms. The display device may additionally or alternatively further include a plurality of phase modulating image display panels configured to form the tiled holograms, and each phase modulating image panel may additionally or alternatively be spaced from adjacent phase modulating image display panels. The display device may additionally or alternatively further include a spatial light modulator, and the phase modulating image producing panel may additionally or alternatively be configured to reflect converging light of a zero order toward the spatial light modulator for production of a different image than the image produced by the tiled holograms. The different image may additionally or alternatively include one or more of a peripheral image configured to surround the image produced by the tiled holograms and a correction image configured to selectively attenuate the image produced by the tiled holograms. Any or all of the above-described examples may be combined in any suitable manner in various implementations.

Another example provides an example display device including a light source, a phase modulating image producing panel, a spatial light modulator, and a holographic optical element, and the holographic optical element may additionally or alternatively be configured to receive collimated light from the light source and to output converging light toward the phase modulating image producing panel, and the phase modulating image producing panel may additionally or alternatively be configured to form a foveal holographic image from one or more orders of diffracted light and to reflect converging light of a zero order toward the spatial light modulator for production of a different image. The display device may additionally or alternatively include an eye-tracking system configured to track a gaze direction of a user of the display device, and the phase modulating image producing panel may additionally or alternatively be further controllable to modify a resolution of each of a plurality of portions of the foveal image based on the gaze direction. The phase modulating image producing panel may additionally or alternatively be controllable to produce the foveal image via an array of tiled holograms, each of the tiled holograms may additionally or alternatively be individually-addressable, and controlling the resolution of each of the tiled holograms may additionally or alternatively include sending higher resolution data to tiled holograms in the center of the foveal vision region than to tiled holograms in another vision region of the display. The display device may additionally or alternatively further include a plurality of phase modulating image display panels configured to form the tiled holograms, and each tiled hologram may additionally or alternatively be spaced from adjacent tiled holograms. The light source may additionally or alternatively include a directable light source controllable to direct light in a direction based upon the gaze direction to adjust a location at which the foveal image is viewable, and the display device may additionally or alternatively further include a diffractive optical element configured to form a plurality of spatially separated eyeboxes in which the foveal and surround images are viewable. The spatial light modulator may additionally or alternatively be further configured to selectively attenuate the foveal image displayed by the phase modulating image producing panel. The different image may additionally or alternatively include one or more of a peripheral image configured to surround the foveal image and a correction image configured to selectively attenuate the foveal image. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display device comprising:
   a phase modulating image producing panel; and
   a holographic optical element configured to receive collimated light and to output converging light toward the phase modulating image producing panel, the phase modulating image producing panel being configured to diffract a portion of the converging light output by the holographic optical element to produce an image with the portion of the converging light diffracted and change the portion of the converging light to collimated or diverging light such that zero-order undiffracted light reflected by the phase modulating image producing panel remains converging.

2. The display device of claim 1, further comprising an eye-tracking system configured to track a gaze direction of a user of the display device.

3. The display device of claim 2, further comprising a directable light source controllable to direct light in a direction based upon the gaze direction to adjust a location at which the image is viewable.

4. The display device of claim 2, further comprising a diffractive optical element configured to form a plurality of spatially separated eyeboxes in which the image is viewable.

5. The display device of claim 2, wherein the phase modulating image producing panel is further controllable to modify a resolution of each of a plurality of portions of the image based on the gaze direction.

6. The display device of claim 5, wherein the phase modulating image producing panel is controllable to produce the image via an array of tiled holograms.

7. The display device of claim 6, wherein each of the tiled holograms is individually-addressable via addressing lines of a bus, an h-tree interconnect, a routed on-chip interconnect, or a pipelined distribution tree interconnect, wherein controlling the resolution of each of the tiled holograms comprises sending higher resolution data to tiled holograms in a foveal vision region than to tiled holograms in another vision region of the display.

8. The display device of claim 6, wherein the array of tiled holograms is formed by providing multiple separate image producing panels that are spaced from one another.

9. The display device of claim 1, further comprising a spatial light modulator, wherein the phase modulating image producing panel is configured to reflect converging zero order undiffracted light toward the spatial light modulator for image production.

10. The display device of claim 9, wherein the spatial light modulator is controllable to produce one or more peripheral images configured to surround the image and a correction image configured to selectively attenuate the image.

11. A display device, comprising:
a light source;
a phase modulating image producing panel configured to produce a holographic image via light from the light source;
an eye-tracking system;
a processor configured to execute computer-readable instructions; and
a storage device comprising instructions stored thereon that are executable by the processor to
track, via the eye-tracking system, a gaze intersection with the display device,
control the phase modulating image producing panel to produce an image via an array of tiled holograms formed via the phase modulating image producing panel, the array of tiled holograms comprising a region of higher resolution tiled holograms closer to a gaze intersection and a region of lower resolution tiled holograms farther from the gaze intersection,
detect, via the eye-tracking system, a change in the gaze intersection, and
control the phase modulating image producing panel to increase a resolution of the region of lower resolution tiled holograms and to decrease a resolution of the region of higher resolution tiled holograms based upon the change in the gaze intersection.

12. The display device of claim 11, wherein each of the tiled holograms is individually-addressable, and wherein decreasing the image resolution of the region of lower resolution tiled holograms comprises sending a larger number of replicated copies of smaller tiled holograms in the region of lower resolution holograms.

13. The display device of claim 12, further comprising a plurality of phase modulating image display panels configured to form the tiled holograms, and wherein each phase modulating image panel is spaced from adjacent phase modulating image display panels.

14. The display device of claim 11, further comprising a spatial light modulator, wherein the phase modulating image producing panel is configured to reflect converging light of a zero order toward the spatial light modulator for production of a different image than the image produced by the tiled holograms.

15. The display device of claim 14, wherein the different image comprises one or more of a peripheral image configured to surround the image produced by the tiled holograms and a correction image configured to selectively attenuate the image produced by the tiled holograms.

16. A display device comprising:
a light source;
a phase modulating image producing panel;
a spatial light modulator; and
a holographic optical element,
wherein the holographic optical element is configured to receive collimated light from the light source and to output converging light toward the phase modulating image producing panel,
and wherein the phase modulating image producing panel is configured to form a foveal holographic image from one or more orders of diffracted light and to reflect converging light of a zero order toward the spatial light modulator for production of a different image.

17. The display device of claim 16, further comprising an eye-tracking system configured to track a gaze direction of a user of the display device, wherein the phase modulating image producing panel is further controllable to modify a resolution of each of a plurality of portions of the foveal image based on the gaze direction.

18. The display device of claim 17, wherein the phase modulating image producing panel is controllable to produce the foveal image via an array of tiled holograms, wherein each of the tiled holograms is individually-addressable, and wherein controlling the resolution of each of the tiled holograms comprises sending higher resolution data to tiled holograms in the center of the foveal vision region than to tiled holograms in another vision region of the display.

19. The display device of claim 18, further comprising a plurality of phase modulating image display panels configured to form the tiled holograms, and wherein each tiled hologram is spaced from adjacent tiled holograms.

20. The display device of claim 16, wherein the light source comprises a directable light source controllable to direct light in a direction based upon the gaze direction to adjust a location at which the foveal image is viewable, the display device further comprising a diffractive optical element configured to form a plurality of spatially separated eyeboxes in which the foveal and surround images are viewable.

21. The display device of claim 16, wherein the spatial light modulator is further configured to selectively attenuate the foveal image displayed by the phase modulating image producing panel.

22. The display device of claim 16, wherein the different image comprises one or more of a peripheral image configured to surround the foveal image and a correction image configured to selectively attenuate the foveal image.

* * * * *

UNITED STATES PATENT AND TRADEMARK OFFICE
CERTIFICATE OF CORRECTION

PATENT NO. : 10,210,844 B2
APPLICATION NO. : 14/754451
DATED : February 19, 2019
INVENTOR(S) : Joel S. Kollin et al.

It is certified that error appears in the above-identified patent and that said Letters Patent is hereby corrected as shown below:

In the Claims

In Claim 12, Column 15 Line 56, delete "lower" and insert --higher--.

Signed and Sealed this
Sixteenth Day of June, 2020

Andrei Iancu
*Director of the United States Patent and Trademark Office*